United States Patent
Urey et al.

(10) Patent No.: US 7,733,493 B2
(45) Date of Patent: Jun. 8, 2010

(54) FOURIER TRANSFORM SPECTROMETER

(75) Inventors: Hakan Urey, Istanbul (TR); Calgar Ataman, Istanbul (TR)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 11/330,604

(22) Filed: Jan. 12, 2006

(65) Prior Publication Data

US 2007/0159635 A1 Jul. 12, 2007

(30) Foreign Application Priority Data

Dec. 23, 2005 (EP) .................. 05028287

(51) Int. Cl.
*G01J 3/45* (2006.01)
(52) U.S. Cl. ...................... 356/452; 356/451
(58) Field of Classification Search ................ 356/451, 356/305, 328, 334, 452; 359/558, 559, 563, 359/572, 573
See application file for complete search history.

(56) References Cited

U.S. PATENT DOCUMENTS

| | | | | |
|---|---|---|---|---|
| 5,841,579 | A * | 11/1998 | Bloom et al. | 359/572 |
| 6,181,458 | B1 * | 1/2001 | Brazas et al. | 359/290 |
| 6,204,925 | B1 * | 3/2001 | Prikryl et al. | 356/498 |
| 6,894,836 | B2 * | 5/2005 | Christenson | 359/563 |
| 2003/0203530 | A1 * | 10/2003 | Lee et al. | 438/72 |
| 2004/0001257 | A1 * | 1/2004 | Tomita et al. | 359/572 |
| 2005/0237617 | A1 * | 10/2005 | Carr et al. | 359/569 |
| 2007/0146720 | A1 * | 6/2007 | Cox et al. | 356/451 |

OTHER PUBLICATIONS

Manzardo, Omar, "Micro-sized Fourier Spectrometers", PhD Thesis, University of Neuchatel, Neuchatel Switzerland, (2002), 133 pgs.*
Manzardo, Omar, et al., "Infrared MEMS- based Lamellar Grating Spectrometer", Proceedings of the SPIE, SPIE, Bellingham, VA. vol. 5455, (Apr. 29, 2004), 1-8.*
Bhalotra et al., *Optical Mems*, 2000 IEEE/LEOS International Conference, 93-94 (2000). XP-010518553.
Hoffmann et al., *Infrared Physics*, 17: 451-456 (1977). XP-002376795.
Manzardo et al., *Optics Letters*, 29[13]: 1437-1439 (2004). XP-002376793.
Noell et al., *IEEE J. Sel. Top. Quantum Electronics*, 8[1]: 148-154 (2002). XP-002376794.
Ataman et al., "A Fourier Transform Spectrometer Using Resonant Vertical Comb Actuators," *J. Micromech. Microeng.*, 16: 2517-2523 (2006).

* cited by examiner

*Primary Examiner*—Tarifur Chowdhury
*Assistant Examiner*—Jonathan M Hansen
(74) *Attorney, Agent, or Firm*—Leydig, Voit & Mayer, Ltd.

(57) ABSTRACT

The invention relates to a Fourier transform spectrometer comprising a binary grating with variable depth, the grating comprising a first set of mirrors and a second set of mirrors, the mirrors of the first set of mirrors and the mirrors of the second set of mirrors being arranged in an alternating order and at least one of the sets of mirrors being carried by fingers of a comb structure of a wafer, the spectrometer further comprising an actuator for prompting a motion of the second set of mirrors and a detector for detecting a radiation reflected by the grating, the mirrors being orientated in a plane defined by said wafer and said motion of the second set of mirrors being given by a translation in a direction vertical to said wafer plane.

8 Claims, 6 Drawing Sheets

FOURIER TRANSFORM SPECTROMETER

CROSS REFERENCE TO RELATED PATENT APPLICATIONS

Figure 1:
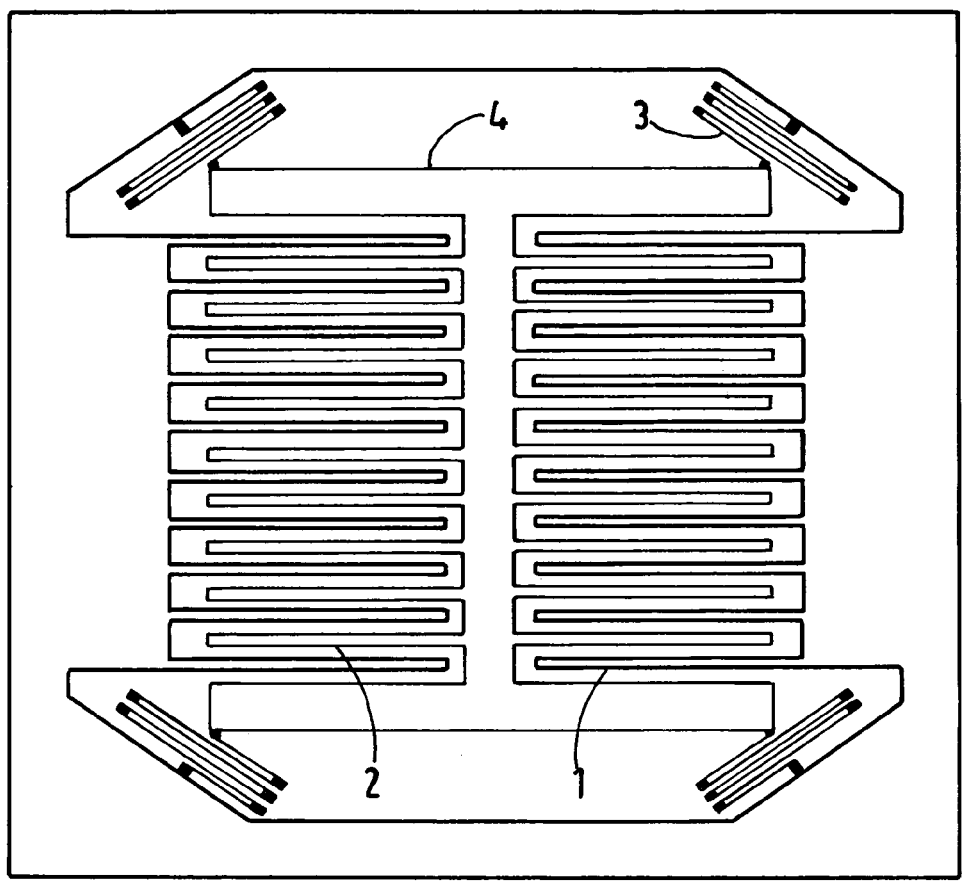

This application claims priority to European patent application no. 05 028 287.0, filed Dec. 23, 2005, which claims priority to U.S. Provisional application No. 60/640,190, filed Dec. 30, 2004, all of which are hereby incorporated by reference.

The present invention relates to a Fourier transform spectrometer comprising a binary grating with variable depth, the grating comprising a first set of mirrors and a second set of mirrors, the mirrors of the first set and the mirrors of the second set being arranged in an alternating order and at least one of the set of mirrors being carried by fingers of a comb structure of a device, the spectrometer further comprising an actuator for prompting a motion of the second set of mirrors and a detector for detecting a radiation—typically light—reflected by the grating. Such a spectrometer may be designed e.g. for chemical, biological and agricultural inspection applications.

A normal Fourier transform spectrometer (FTS) is a Michelson interferometer with a movable mirror. By scanning the movable mirror over some distance, an interference pattern (interferogram), which encodes the spectrum of the source, is produced. This encoding interference pattern is actually the Fourier transform of the spectrum of the source. Therefore, capturing the interferogram with a 2-D array of detectors and Fourier transforming it will lead to information on spectral content of the source.

The invention of Fourier Transform Spectroscopy coincides with the A. Michelson's invention of the Michelson interferometer in 1880. However, due to the lack of sensitive detector arrays and Fourier Transforming computers, FTS did not become a common interferometric measurement technique, until recently. Fast detector arrays, efficient Fourier Transform algorithms and increasing computer power of microprocessors enabled FTS to become a well-known and widely-used measurement technique. It is a powerful tool to measure the spectra of weak extended sources, since it offers distinct throughput and multiplexing advantages, providing higher signal-to-noise ratio performance compared with other methods. Today, commercial Fourier transform spectrometers are widely available. Aided by fast computers which perform Fourier transforms in a flash, visible, infrared, and microwave Fourier transform spectrometers are common laboratory instruments used for spectroscopy in many diverse disciplines.

A Lamellar Grating Interferometer (LGI) is a FTS based on a diffraction grating operating in the zeroth order. An LGI has many advantages over a standard FTS, such as the need for only a single detector instead of a detector array, lack of a beam-splitter, and speed. Moreover, simpler operation principle and fewer optical components enable us to built very compact spectrometers with reasonable performance.

A state of the art spectrometer of the kind defined above has the mirrors forming the binary grating placed on a side wall of the device, the actuator prompting a motion of the movable mirrors in a direction in the wafer plane. As a consequence, the mirrors have only a very small surface—resulting in a fairly low optical efficiency—and the motion of the movable mirrors is limited by the device geometry so that only a very limited optical path difference can be generated between two parts of a wave reflected by the fixed and the movable mirrors respectively.

It is the object of the present invention to provide a corresponding spectrometer allowing a higher spectral resolution and furthermore rendering possible the analysis of weaker sources compared to the state of the art.

This object preferably is achieved by the characterizing features of the present invention. Advantageous embodiments and further developments of the solution will be apparent from the description of the invention provided herein.

By the fact, that the mirrors are orientated in a plane defined by the device and that the motion of the second set of mirrors prompted by the actuator is given by a translation in a direction vertical to the wafer plane (device plane), at least two advantages are realized. As the motion of the mirrors is out-of-plane, the travel range of those mirrors is not limited any more by neighboured parts of the device. Therefore, a much larger optical path difference can be realized by a—typically oscillating—movement of the movable mirrors, resulting in a significantly improved spectral resolution of the spectrometer. Furthermore, as the mirrors are orientated in the device-plane corresponding to the original wafer plane, the mirrors can be laid out with a comparably large surface so that the device is also suited for the analysis of comparably weak sources due to an increased active surface.

In typical embodiments of the invention, only the second set of mirrors is given by a set of movable mirrors, whereas the first set of mirrors is given by a faxed set of mirrors. However, the spectrometer can also have both sets of fingers moving if they move with a phase shift, ideally with 180° phase in between. In the following, the first set of mirrors is referred to as the fixed set of mirrors and the second set of mirrors as the movable set of mirrors, knowing that the same is true for embodiments with both sets of mirrors being movable. (In that case, an out-of-plane motion of both sets of mirrors is prompted by the actuator).

In a preferred embodiment of the invention, the actuator is given by an electric comb drive actuator being formed by a comb structure carrying (or serving as substrate for) the mirrors. I.e. the fingers of said comb structure are at least part of the actuator, typically serving as electrodes. In that case, the fingers of the comb structure are used both for the actuation and for the optical functionality as mirrors of the grating or as substrates for those mirrors. In that way, a simple device can be realized minimizing size, complexity, costs, and design effort of the spectrometer. Typically, both sets of mirrors will be carried by fingers of a comb structure, the comb structures penetrating each other. The mirrors can be given by a surface of said fingers themselves or by a coating layer on the fingers. To this end, the fingers of the comb structure can e.g. be covered with aluminium.

In a typical embodiment of the invention, the set of movable mirrors is elastically connected to the set of fixed mirrors by suspension means allowing an oscillating movement of the set of movable mirrors.

In a particularly simple embodiment of the invention, allowing a small and cheap realization of the spectrometer, the comb structure carrying the fixed mirrors and the suspension means are formed integrally with one another, typically made on one single wafer. The set of movable mirrors can also be made of a bond of several wafers to extend the travel range of the resulting actuator.

A corresponding device as well as the wafer, where it is made from, typically comprises at least one silicon layer which is preferably heavily doped for having a sufficiently high electrical conductivity. Typically, a silicon-on-insulator wafer will be used, the silicon layer preferably being arranged on a supporting substrate by means of an insulating layer, said supporting substrate being removed at least in an area defined by the set of movable mirrors.

A preferred method for producing a corresponding spectrometer comprises the following steps in the given order:

A single crystal silicon layer (e.g. an epitaxial layer) of a silicon-on-insulator wafer—preferably a heavily doped silicon layer—is structured—e.g. by etching—so as to define an oscillating body with a comb structure for carrying the movable mirrors, a frame with a comb structure for carrying the fixed mirrors, and suspension means connecting the oscillating body with the frame.

A back etching process is carried out for removing a supporting substrate and an insulator layer which separates the supporting substrate from said single crystal silicon layer, at least below the oscillating body.

The fingers of the comb structures can finally be covered, e.g. with aluminium, to form the mirrors. If different parts of the silicon layer of the wafer shall be electrically insulated from each other, e.g. a part defining the set of movable mirrors from a part defining the set of fixed mirrors, insulation trenches can be realized in the single crystal silicon layer while this layer is structured and the insulation trenches can be refilled, e.g. with poly-silicon, after a growing of a layer of an insulating oxide on edges of the trenches. A feature of this last process is that filled insulation trenches separate regions of the wafer electrically but connect them mechanically. This can have great advantages, especially if the comb structures are used both for carrying the mirrors and as a comb drive actuator for prompting the motion of the movable mirrors.

Most preferably, a silicon-on-insulator wafer with a silicon layer of between 20 µm and 40 µm thickness and/or a thermal buried oxide layer of between 0.5 µm and 1.5 µm serving as insulation layer is used. The supporting substrate will usually have a thickness of between 300 µm and 450 µm.

In order to achieve a small system size enabling portable devices with nevertheless high efficiency, the fingers of the comb structure can be made with a length of between 800 µm and 1600 µm and/or a width of between 50 µm and 100 µm. However, also a diffraction grating period of only a few microns would still function as desired.

The detector, typically a photo diode, can be placed to measure an intensity of a zeroth order of a diffraction pattern generated by the grating, i.e. usually in a central maximum of the diffraction pattern.

In order to prompt an oscillating motion of the set of movable mirrors, the spectrometer can further comprise a control device for applying an alternating voltage between electrodes of the actuator, the electrodes typically being given by the fingers of the comb structure. The spectrometer and/or the control device are most preferably designed in a way that an oscillation of the set of movable mirrors in a translational out-of-plane resonant mode (typically the fundamental mode of the system) is generated. In this way, a Fourier transform of the spectrum is scanned during an oscillation period. To this end, the control device can additionally comprise means for detecting zero passages of the oscillation of the movable mirrors, given e.g. by an optical detector. The control device can further be arranged to reduce the voltage to a minimum value substantially at each zero passage of the oscillation and/or to increase the voltage applied between the electrodes to a maximum value at each maximum deflection of the set of movable mirrors. In order to permit an oscillation build-up of the oscillating body, an asymmetry can be provided of the system given by the movable mirrors, the suspension means, and the fixed mirrors.

Figure 2:
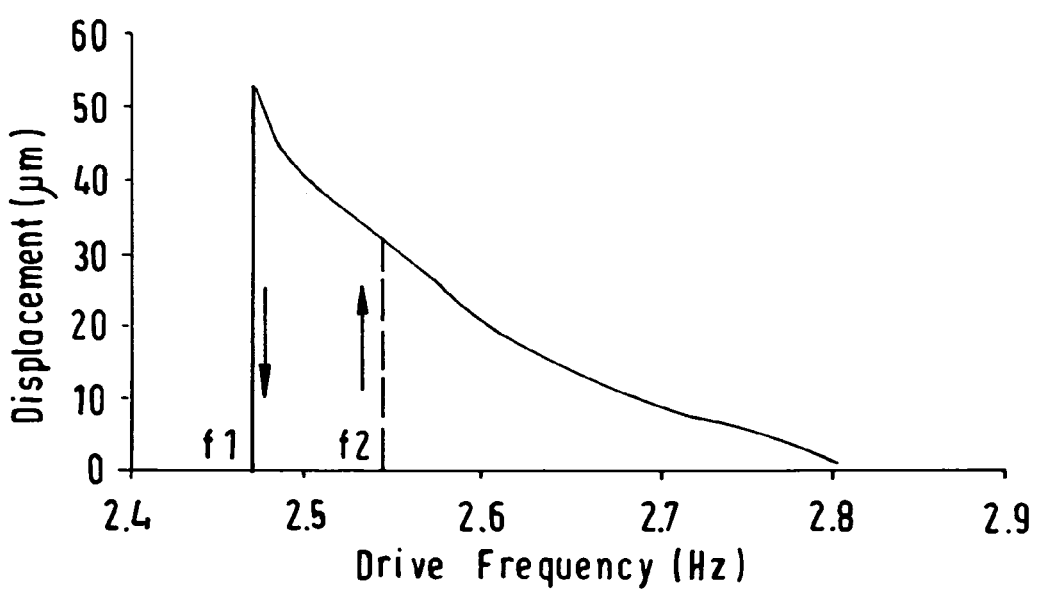
Figure 3:
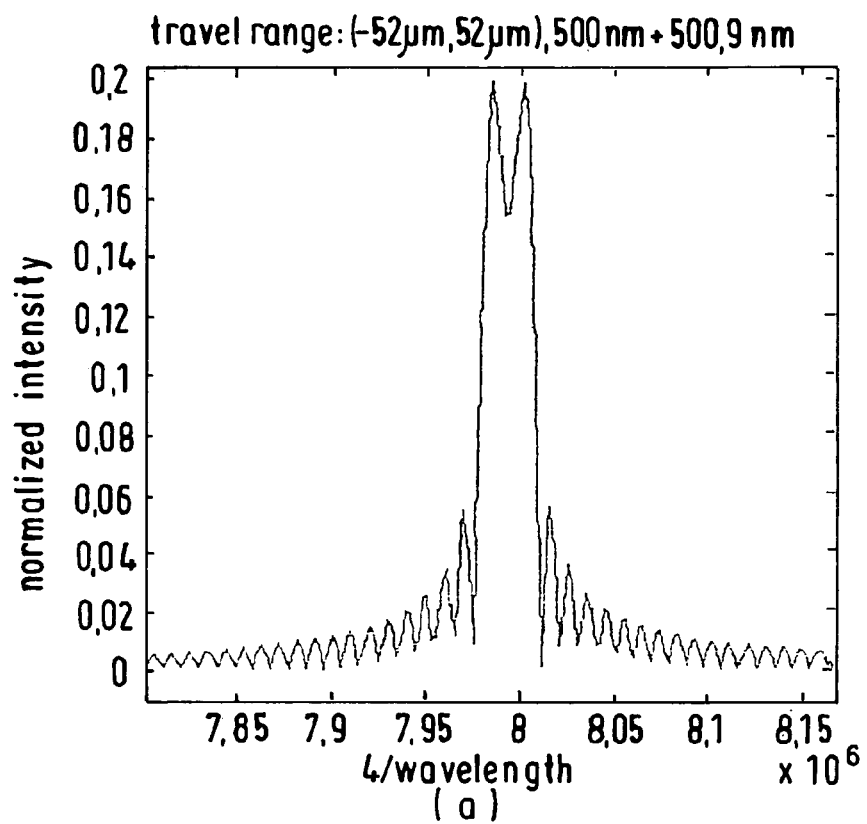
Figure 3:
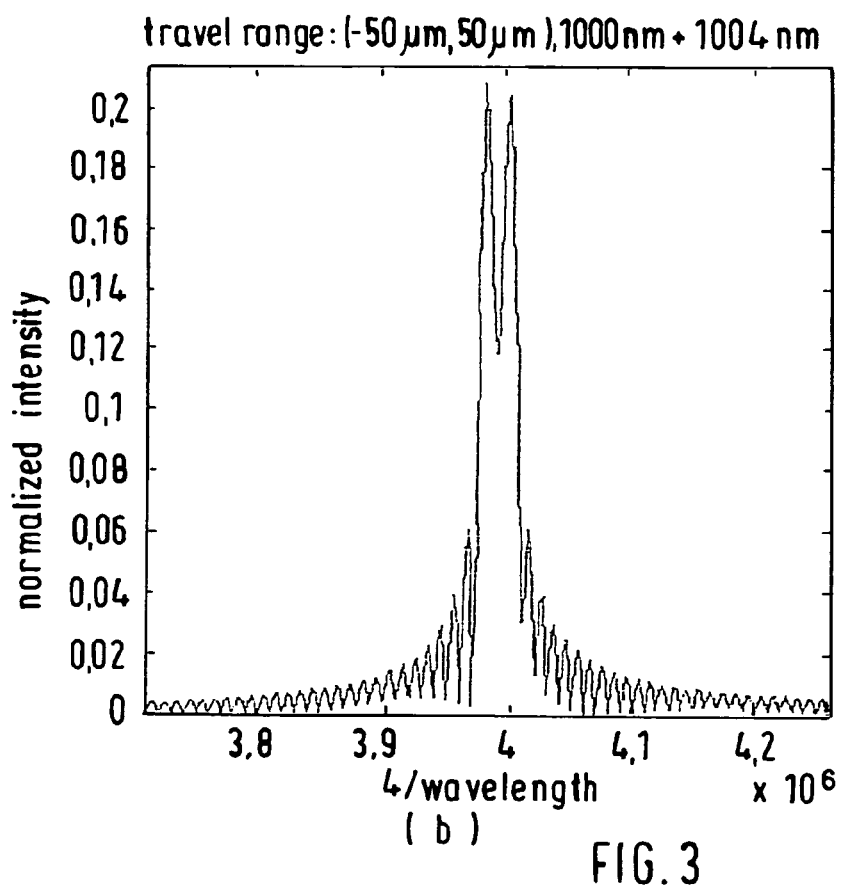
Figure 4:
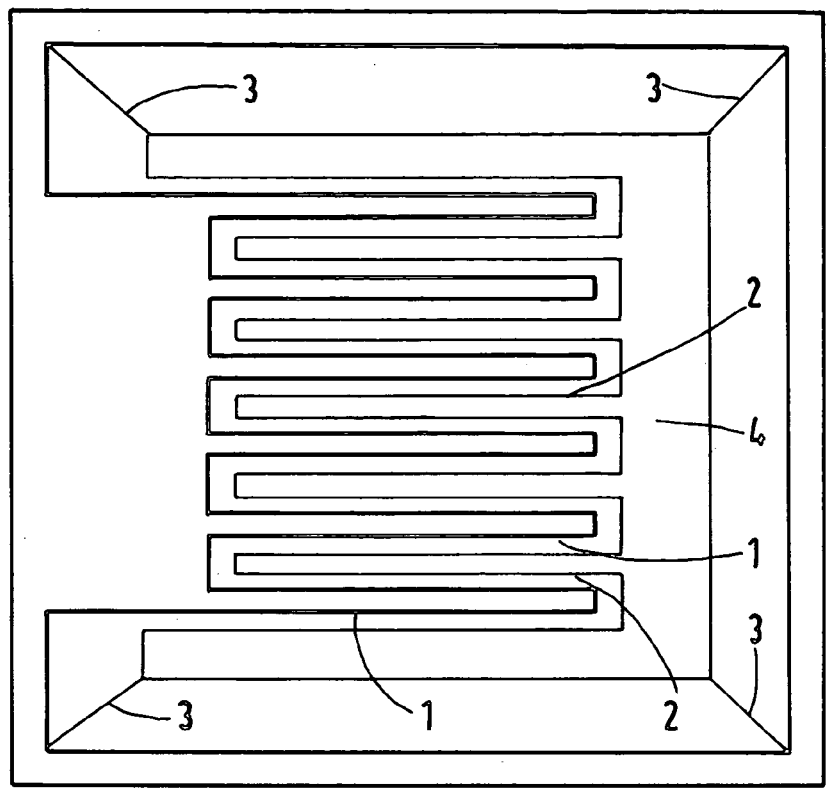
Figure 5:
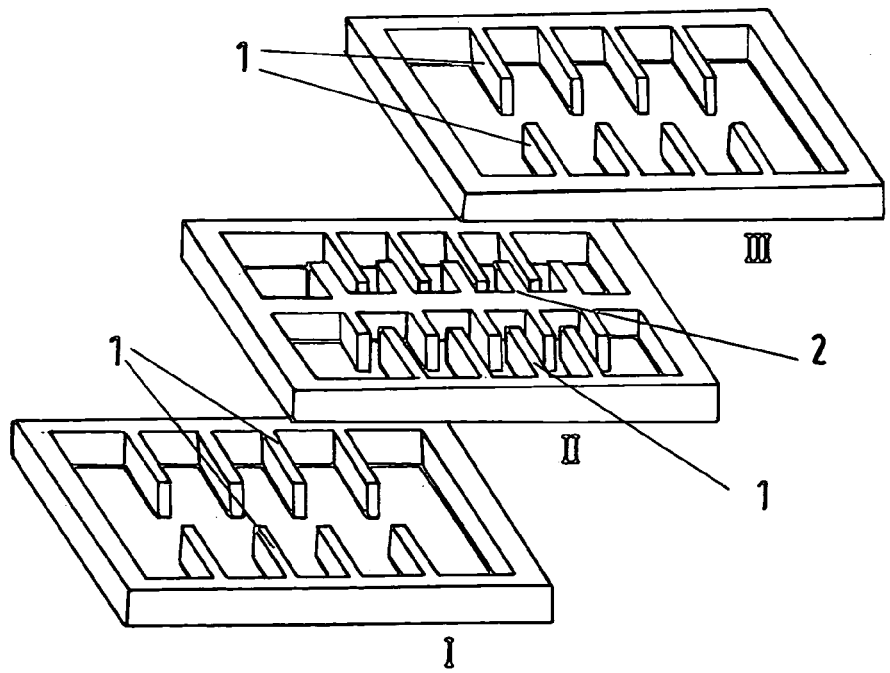
Figure 6:
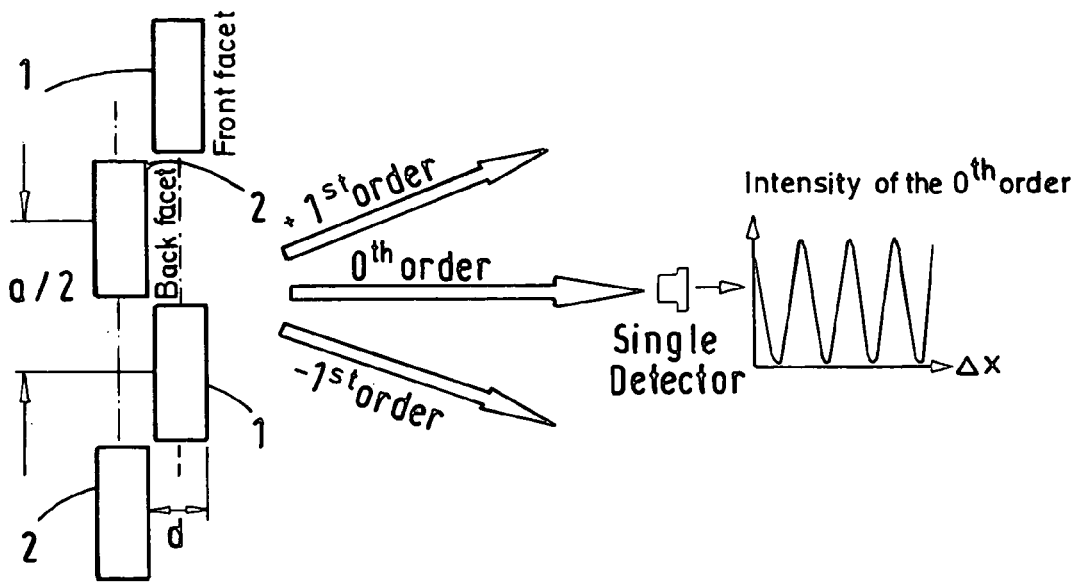
Figure 7:
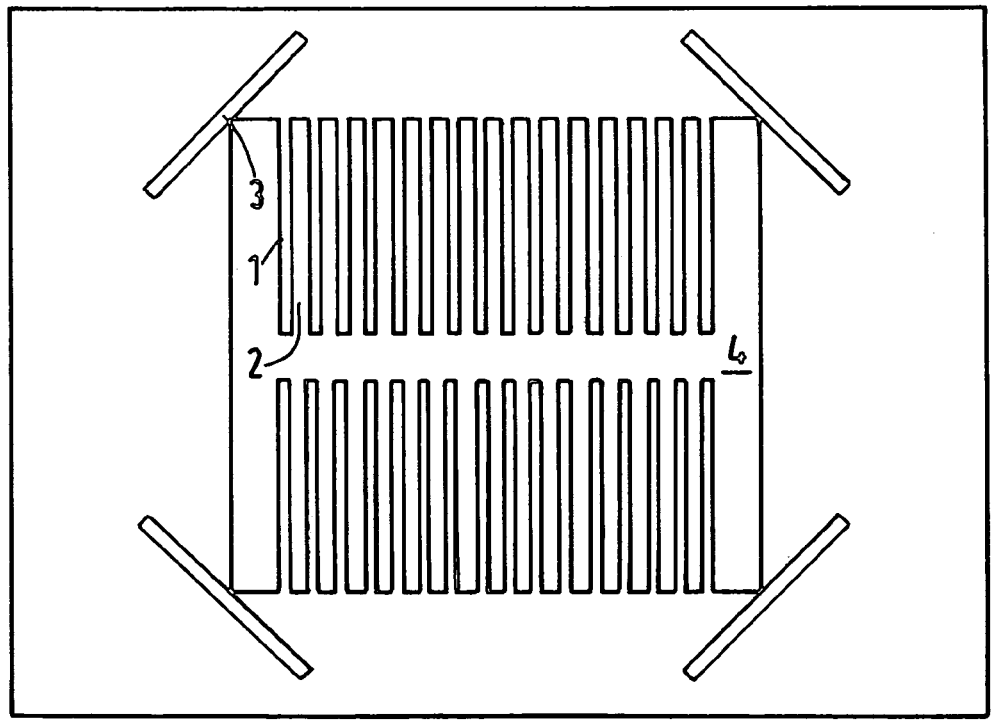
Figure 8:
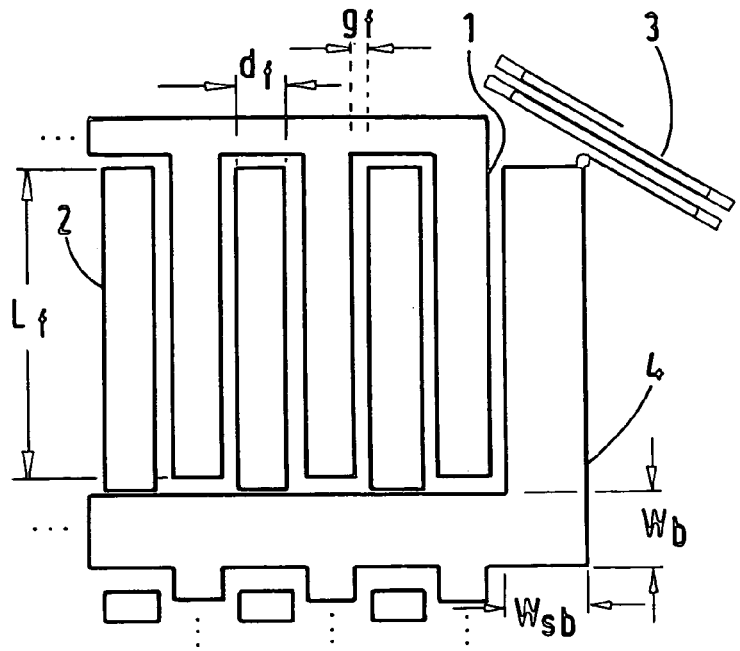
Figure 9:
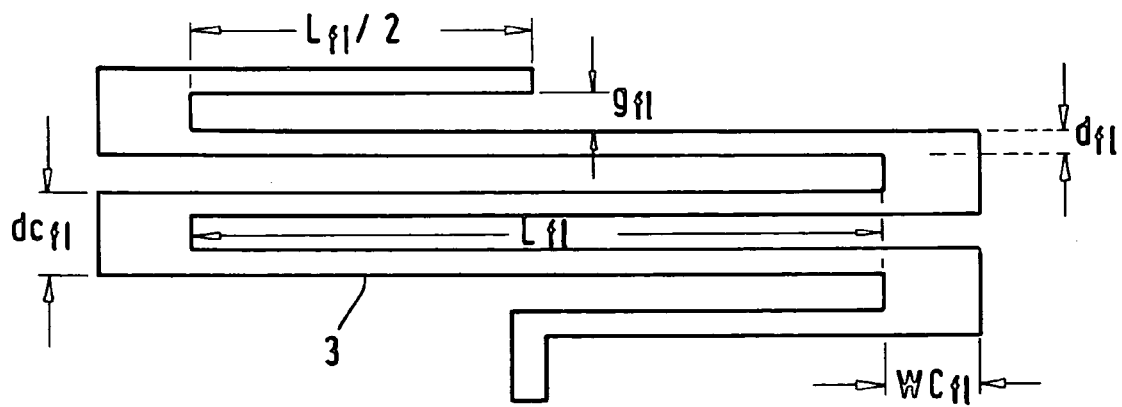
Figure 10:
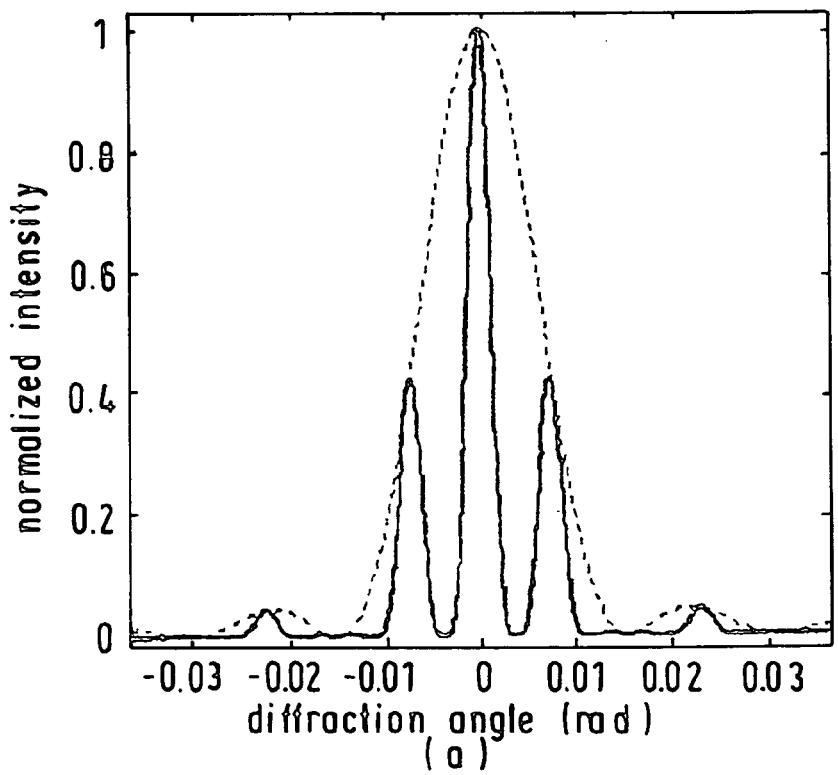
Figure 10:
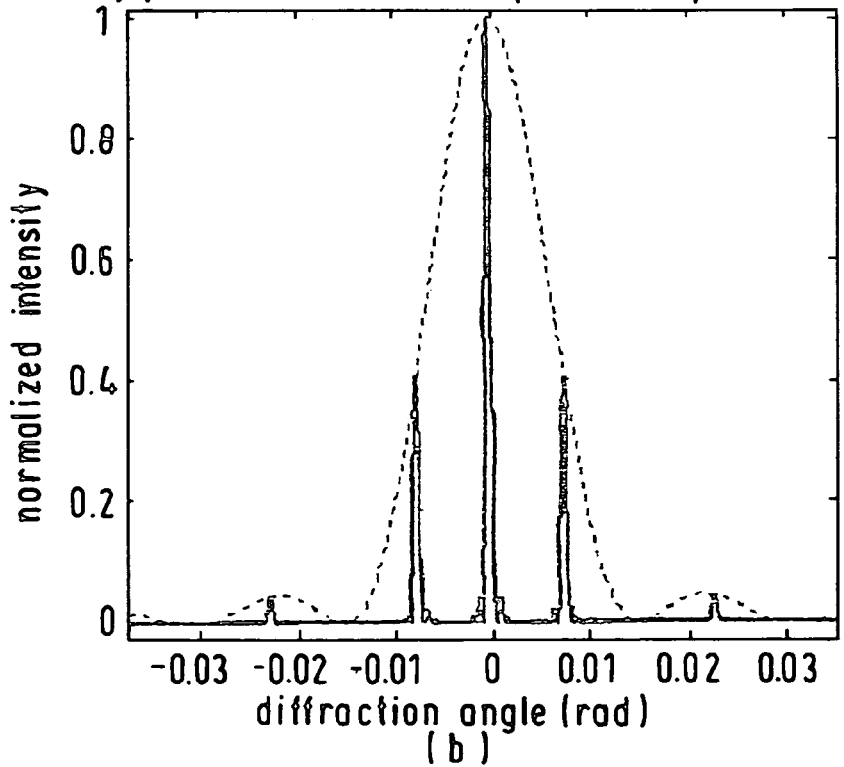

In the following, examples of embodiments of the present invention will be explained in detail making reference to the drawings 1 to 10, FIG. 1 showing a schematic top view of a wafer forming a part of a Fourier transform spectrometer according to the present invention, FIG. 2 showing a measured hysteretic response of an actuator of the same spectrometer, FIG. 3 showing a spectral resolution of the same spectrometer for ±50 µm vertical deflection assuming two monochromatic sources at wave lengths 500 nm and 500.9 nm in diagram a) and at wave lengths 1000 nm and 1004 nm in diagram b), FIG. 4 showing a schematic top view of a wafer with an alternative design for a spectrometer according to the invention, FIG. 5 showing an exploded illustration of a corresponding binary grating for a spectrometer according to the invention made of three wafers showing an enhancement of comb finger travel range by multiple wafer bonding, FIG. 6 showing a schematic illustration of a binary diffraction grating and modulation of the zeroth order of a diffraction pattern depending on a depth d of the grating, FIG. 7 showing a top view of a wafer for a grating of a spectrometer according to the invention with a preferred layout of the grating, FIG. 8 showing a top view of a detail of the same grating with spectrometer dimensions, FIG. 9 showing a top view of another detail of the same spectrometer, namely a spring connecting a fixed part of the wafer with a movable part of the wafer with flexure dimensions, FIG. 10 showing two diagrams illustrating the separation of neighboured diffraction orders when two periods of the gratings are illuminated (a) or when ten periods of the grating are illuminated (b) respectively.

FIG. 1 illustrates the top view of an out-of-plane moving diffraction grating structure. The shown structure is made of one single silicon-on-insulator wafer and part of a Fourier transform spectrometer. The grating comprises a set of fixed mirrors being carried by fixed fingers 1 and a set of movable mirrors being carried by movable fingers 2 of a comb structure, the fixed fingers and the movable fingers being arranged in an alternating order and the mirrors being given by an aluminium coating of the fingers 1 and 2. The movable mirrors and the fixed mirrors are orientated in a plane defined by the wafer. The set of movable fingers 2 is elastically connected to the set of fixed fingers 1 by suspension means 3 given by four springs or flexures allowing a translational out-of-plane oscillation of the set of movable fingers 2 with respect to the set of fixed fingers 1. The comb structure carrying the fixed mirrors, the comb structure carrying the movable mirrors and the suspension means 3 are formed integrally with one another. The comb structures with the fixed fingers 1 and the movable fingers 2, at the same time, form an electric comb drive actuator for prompting a motion of the set of movable fingers 2 with the movable mirrors, said motion being given by a translation in a direction vertical to the wafer plane and resulting in said out-of-plane oscillation. To this end, the spectrometer further comprises a control device for applying an alternating voltage between the fixed fingers 1 and the movable fingers 2, those fingers 1 and 2 forming electrodes of the actuator.

Finally, the Fourier transform spectrometer also comprises a photodiode as a detector for detecting light reflected by the grating. The detector, which is not shown in the figure, is placed to measure an intensity of a zeroth order of a diffraction pattern generated by the grating.

The current configuration has larger clear aperture, simpler fabrication, and higher efficiency compared to other MEMS spectrometers (MEMS standing for micro-mechanical systems).

The use of the polished top surface and out-of-plane actuation produces good flatness and a large clear aperture (3 mm×3 mm) for the incident beam. Since the structure utilizes the zeroth order diffracted light without requiring additional optics or beam splitters, the optical efficiency is >90% and limited only by the fill-factor of the comb FIGS. 1 and 2. The tested devices are capable of producing ±52 µm at 28 V with square wave excitation near the resonant frequency of about 1.3 kHz.

The comb fingers 1 and 2 have a high fill-factor (70 µm finger width and 5 µm gap) and are covered with a thin aluminium layer. Movable comb fingers 2 are connected to a 250 µm wide H-shaped Silicon backbone 4 (not coated with aluminium) to increase rigidity and then to the fixed frame via four folded flexure beams serving as suspension means 3. Flexures have varying cross-sectional width to have uniform stress distribution and to provide low stiffness within a compact structure. Low stiffness springs lower the resonant frequency and the readout electronics speed requirements, and increase the deflection, which improves the spectral resolution. The flexures are placed at a 45° angle to obtain a better mode separation between the fundamental translation mode and higher order torsional modes.

The structure is balanced and does not operate at DC. The structure responds only to a narrow range of frequencies near its resonance and shows a hysteretic frequency response as given in FIG. 2. Maximum oscillation amplitude can only be observed sweeping down the excitation frequency once the oscillation started. FIG. 3 shows the results of the spectral resolution simulations assuming 50 µm out-of-plane deflections and yields a spectral resolution of 1 nm in the visible band and better than 9 nm around 1.5 µm wave band.

The spectrometer is fabricated on silicon-on-insulator (SOI) wafer with a CMOS compatible process. The 30 µm thick structural layer is highly doped to maintain conductivity. For the definition of wire-bond electrodes, an oxide and a metal layer is deposited on the structural layer and then patterned. On the backside of the wafer, a hard mask consisting of an oxide and a nitride layer is patterned for a further backside etching step. Then, a 100 nm thick aluminium layer is deposited on the movable and fixed fingers to enhance reflectivity. Following to that, the substrate under the mechanical elements and the buried oxide are removed in a TMAH and an HF solution, respectively. Finally, the mechanical elements are released by a deep silicon etch process.

The method for producing the spectrometer shown in FIG. 1 particularly comprises the following steps: An epitaxial layer of the silicon-on-insulator wafer is structured so as to define an oscillating body comprising the backbone 4 and the movable fingers 2, a frame with a comb structure for carrying the fixed mirrors (the fixed fingers 1), and the suspension means connecting the oscillating body with the frame. Afterwards, a back etching process is carried out for removing a supporting substrate and an insulator layer which separates the supporting substrate from said epitaxial layer at least below the oscillating body. The epitaxial layer is given by a 30 µm silicon-layer, the insulating layer by a layer of thermal buried oxide of approximately 1 µm thickness. The whole wafer has a thickness of roughly 400 µm. The aluminium mirror layer has a thickness of about 100 nm. A part of the frame including the fixed fingers 1 is electrically insulated from the back bone with the movable fingers 2. This is achieved by filled insulation trenches that separate regions of the silicon electrically, but connect them mechanically. In this way, the silicon-on-insulator wafer is structured into different electrodes and their electrical interconnections by a process as follows:

Fabrication starts with an anisotropic etch in plasma of 1 µm wide and 30 µm deep trenches with stop on the buried oxide (DRIE). Thermal oxidation then grows 180 nm insulating oxide. Trenches are refilled with poly-silicon for the mechanical connection. Access poly-silicon is removed from the surface by chemical mechanical polishing (CMP).

The next steps realize the bond pads: 750 nm PE-CVD of an interlayer insulation oxide, etching via holes, sputter deposition of bond pad aluminium, structured metal etch, 300 nm PE-CVD of a passivation oxide. The following structured oxide etch opens the blank silicon surface. Only bond pad metal and the filled insulation trenches remain covered. At this process step, electrical measurement monitors the insulation resistances of the filled trenches.

In order to prepare the anisotropic backside wet etch, the wafers are then grinded from the backside to 400 µm thickness, a multiple layer hard mask is deposited by PE-CVD and structured. E-beam evaporation on the front side then deposits a 100 nm thick aluminium mirror layer, which is structured by wet etching and protected by a resist coating.

During the anisotropic backside wet etch, the front sides are protected by vacuum etch boxes. TMAH is used rather than KOH because of its better selectivity to the PE-CVD hard mask. After the etch stop on the buried oxide, the buried oxide is removed in buffered fluorine acid. A 30 µm thick silicon membrane remains.

In the last etch step, the mechanical elements mirror plate and torsional springs are defined by 5 µm wide trenches that are etched anisotropically (DRIE) through the membrane. The micro scanning mirrors can now be operated on wafer-level in the MEMS end-test.

In the FIGS. 4 to 9, corresponding features of the shown embodiments of the invention are marked with the same reference figures as in FIG. 1. In the following, the invention is explained in more detail.

Whenever a portion of a wavefront, be it sound, a matter wave, or light, is obstructed in some way, the propagation of wave deviates from the rectilinear path. This effect is called diffraction and plays an important role in theory of wave propagation. A repetitive array of diffraction elements, either apertures or obstacles, that has the effect of producing periodic alterations in the phase, amplitude, or both of an emergent wave is said to be a diffraction grating. If these repetitive (periodic) diffraction elements are of rectangular shape, the resulting structure is called rectangular diffraction grating. FIG. 6 shows two periods of a rectangular comb-drive diffraction grating.

The grating introduces a rectangular phase function to the illuminated uniform wavefront, due to the phase difference between the portions of the wavefront reflected from the front and back facets of the grating. This phase difference is given by the following expression $$\phi = \left(\frac{2\pi d}{\lambda}\right)\left[(1+\cos\alpha) + \frac{a}{2d}\sin\alpha\right]$$

where a is the grating period, α is the distance between the front facets and the back facets in a direction vertical to the grating plane, α is the diffraction angle, and λ is the wavelength of the light. The intensity profile of the diffracted light will be transformed due to the diffraction phenomenon as the light propagates. Right after the grating, diffracted light has the identical profile as the grating. Far field (Fraunhofer) diffraction pattern of the light will have the shape of the Fourier transform of the diffraction grating. The far-field intensity profile of the light diffracted from the grating in FIG. 6 is given as:

$$I(\alpha) = A \left[ \frac{\sin\left(\pi a \frac{\sin\alpha}{2\lambda}\right)}{\pi a \sin\left(\frac{\sin\alpha}{2\lambda}\right)} \right]^2 \left[ \frac{\sin\left(N\pi a \frac{\sin\alpha}{\lambda}\right)}{\sin\left(\pi a \frac{\sin\alpha}{\lambda}\right)} \right]^2 \cos^2(\phi)$$

where N is the number of illuminated periods and A is a scaling factor depending on the structure dimensions. The total intensity has three discrete components. The first term has a sinc shaped profile, due to the rectangular shape of the grating. Its width is inversely proportional to the period of the grating, since it is simply the square of the Fourier Transform of the rectangular grating. The second term is a sinc train, resulting from the periodicity of the grating. As the grating period shrinks, the distance between the consecutive orders (diffraction angel) increases. Each order has sinc shape, since the illuminated light is assumed to have a finite profile of rectangular length. Spot-size of these orders shrinks as N increases. In the ideal case, where illuminating light is of infinite span, the second term becomes an impulse train. The third term is the only term that modulates the intensity profile based on the amount of phase difference introduced by the grating.

At the center of the diffraction plane, the first two terms are equal to unity. Therefore, intensity at the center is only modulated by the third intensity component. This can be mathematically seen by setting the diffraction angle α to zero in the previous equation. Resultant intensity function is given by $$I = A\cos^2\left(\frac{4\pi d}{\lambda}\right).$$

This equation implies that at the center of the diffraction plane, the light intensity is related to the wavelength of the diffracted light. This property of rectangular diffraction gratings may be exploited to figure out the spectral content of the diffracted light. If one of the front or back facets of the diffraction grating in FIG. 6 moves periodically along a sufficient travel range, intensity at the center of the diffraction plane will be modulated depending on the wavelength content of the diffracted light. A fast photodetector that is placed at the center of the diffraction plane would capture the intensity modulation. The captured data is called an interferogram. Applying a short-time Fourier Transform operation to the interferogram will lead to the spectral content of the diffracted light.

Due to the periodicity of the figures, comb actuators can be utilized as a tunable phase (diffraction) grating. If a comb actuator is illuminated with a laser beam of enough width to cover multiple periods, the light will be diffracted into many orders as explained above. Therefore, a vertical sliding mode comb actuator can be utilized as a tunable rectangular diffraction grating, which is a good candidate for Lamellar Grating Interferometry. If a resonating comb structure is used as a diffraction grating, the intensity recorded by a detector placed at the center of the diffraction plane would be $$I = A\cos^2\left(\frac{4\pi d_{max}\cos 2\pi f_{res}t}{\lambda}\right)$$

where $f_{res}$ is the resonant frequency of the comb structure. A fast photodetector placed on the center would successfully record the interferograms, which encode the desired spectral content information. However, due to the harmonic motion of the actuator, before the Fourier transform operation, the interferogram data need to have a phase correction.

Modal analysis of comb-driven microscanners showed that it is also possible to actuate those devices in the torsional mode. Therefore, a similar structure can be utilized as a candidate for a Fourier Transform Spectroscope (FTS). However, some major modifications in the microscanner structure are necessary to satisfy some demanding requirements of spectroscopy. Major issues that need to be addressed in spectrometer design are discussed in the following.

The most important specification of a spectrometer is the spectral resolution. A potential LDI design should provide a reasonable resolution in order to be distinguished among many other spectrometers in the market. If the detector and Fourier transforming electronics are sufficiently fast, minimum detectable wavelength difference for a LGI is given by the following formula:

$$\Delta\lambda = \frac{\lambda^2}{d_{max}}$$

According to this, the resolution of an LGI spectrometer is inversely proportional to the wavelength of the illuminating light. A more important result is the dependence of resolution to the maximum travel range. In order to improve the spectral resolution, the travel range of the device is needed to be increased. This constraint sets one of the most important mechanical design objectives.

For spectroscopy application, one is only interested in the intensity of the zeroth order diffraction; therefore, the light going to this order should be well-separated from the light going to other orders. To achieve good separation between orders, small focused spot size on the detector plane and large angle between diffracted orders is desired. This is achieved by illuminating a large number of grating periods by the incoming beam.

In order to loosen the speed requirements on the detector at the diffraction plane, the oscillation frequency of the device should be kept relatively low, but not too low as the spectrum can change during data collection. Therefore, a specific data rate can be reached with a slower/cheaper detector; or a higher data rate can be maintained with the same detector. Speed and amount of data flow through the detector is crucial, since both of these parameters may degrade system performance, if requirements are not satisfied.

Operation Voltage of the device should be kept below 70 V. Electrical insulation of the comb-finger pairs will be accomplished by insulation trenches, which can withstand a maximum potential of 70 V.

Fundamental oscillation mode of the device should be the vertical sliding mode. Good mode separation should be maintained (e.g. natural frequencies for second and higher modes should be sufficiently bigger than fundamental natural frequency) by properly designing the flexure beams.

For safe operation, DC the pull-in voltage of the device should be higher than the typical operation voltage of the device.

During the microfabrication and packaging process, the device may experience mechanical shocks as strong as 2000 times the gravitational acceleration. If the device breaks downs during fabrication, as a result of such a shock, it may damage the process. The flexures of the device should be designed to withstand such large acceleration forces without breakage.

A number of design iterations were went through to meet the mechanical, electrical and optical requirements given in the previous section. The optimum performance was obtained from the design given in FIG. 7 which is similar to the one shown in FIG. 1.

The device has 14 pairs of comb fingers 1 and 2 which are 1.2 mm long and have a 70 μm width. There is a central beam and two side beams forming a H-shaped backbone 4 which are relatively thick and robust. Four folded flexures on each corner of the spectrometer serving as suspension means 3 bind the device to the outer frame. These flexures are at 45° angle to the side beams. FIG. 8 and FIG. 9 show the dimensional parameters of the device.

Table 1 gives the dimensions and mode frequencies of the proposed devices.

TABLE 1

| Dimension | Symbol | Design 1 |
|---|---|---|
| Device Length (μm) | $D_1$ | 2650 |
| Device Width (μm) | $D_2$ | 2700 |
| Central beam width (μm) | $w_b$ | 250 |
| Side beam width (μm) | $w_{sb}$ | 250 |
| Comb finger length (μm) | $L_f$ | 1200 |
| Comb finger width (μm) | $d_f$ | 70 |
| Gap between comb fingers (μm) | $g_f$ | 5 |
| Number of fingers | N | 14 |
| Flexure fold length (μm) | $L_{fl}$ | 1200 |
| Fold corner width (μm) | $wc_{fl}$ | 30 |
| Fold corner length (μm) | $dc_{fl}$ | 40 |
| Flexure width (μm) | $d_{fl}$ | 10 |
| Gap between flexure folds (μm) | $g_{fl}$ | 20 |

The mechanical, electrical and optical performances of the device were simulated using various simulation tools. The results are given in the following:

Due to the displacement dependent force induced by the comb actuator in out-of-plane translational mode, the spectrometer is a parametric oscillator. This device also exhibits hysteretic frequency response, multiple resonances, subharmonic excitations, etc.

The main objective of performing numerical simulations on the dynamic behaviour of the device is to approximate the driving signal amplitude that would lead to reasonable travel ranges. FIG. 2 shows the transient response of the spectrometer when the device is at the peak of its primary parametric resonance. Simulation result shows that sinusoidal excitation of 30 V amplitude provides a travel range of ±52 μm at steady-state. This is a very reasonable result, since both 30 V excitation amplitude and ±52 μm travel range meet our voltage and spectrometer resolution requirements. Q-factor of the device is assumed 20 for the simulations, this is a conservative value for this device and if Q-factor is higher, then operation voltages go down further. We should be able to achieve larger deflections in vacuum during our testing, which means even better spectral resolution.

FIG. 3 shows the responsivity simulation results for the spectrometer. A travel range of ±52 μm, which is the typical value extracted from FIG. 2, leads to a resolution of 0.9 nm at 500 nm (FIG. 3a). When the wavelength is doubled, the resolution drops by a factor of four (FIG. 3b).

FIG. 10 shows the simulation results of separation and the spot-size of the diffraction orders. FIG. 10a plots the intensity profile of the diffraction pattern when light is diffracted from only two periods of grating, where in FIG. 10b, ten gratings are illuminated. For both cases, diffraction angle is constant and equals to 7 mRad, but the spot-size of the diffraction orders shrinks as the number of illuminated grating periods increase.

Modal frequencies of the first five mechanical modes are given in Table 2:

TABLE 2

Mode frequencies of the Fourier Transform Spectrometer

| Mode frequencies (Hz) | | PEA Results |
|---|---|---|
| Out-of-plane Translation | $f_1$ | 1608 |
| Out-of-plane-rocking (around −x) | $f_2$ | 2645 |
| Out-of-plane-rocking (around −y) | $f_3$ | 3034 |
| In-plane Translation (along −x) | $f_4$ | 3080 |
| In-plane Translation (along −y) | $f_5$ | 3084 |

Modal analysis results show that the fundamental oscillation mode of the structure is the out-of-plane translation mode. Moreover, the frequency separation of the modes is sufficiently good. Most important reason behind the good modal characteristics is the four-fold structure. Suppression of the torsional and in-plane translational modes was the biggest advantage of the four-fold design. However, due to the increased stiffness, when compared to the two-fold case, the natural frequency of the device is relatively high, which is the only drawback of the final design.

Due to the large capacitance between comb fingers, this structure may suffer lateral DC pull-in. The pull-in voltage can be reduced by making the gaps between the fingers 1 and 2 larger. Larger gaps also increase the excitation voltage but pull-in voltage has a stronger dependence on the gap width compared to the excitation voltage. Even without any modifications, the device is assumed to have a Q-factor of 20, which is a conservative value. If the Q-factor is >80, then the required excitation voltage will be <15 V and pull-in will no longer be a problem. First prototypes are tested in vacuum at lower actuation voltages without the risk of pull-in.

Finally, a shock analysis of the first device was done. The device was assumed to be under a shock of 2000 g for duration of 600 μsec, which is approximately one period of the out-of-plane translation mode. The shock force was assumed to be uniformly distributed along a perpendicular to the surface of the device. Maximum deflection after the shock was applied turned out to be 270 μm. Maximum deflection was occurred at time 330 μsec.

As expected, the stress is concentrated on the corner of the folds of the flexures. A maximum stress of 1.25 GPa is present when the device is deflected most. This is an acceptable stress value for Silicon flexures; however, a further reduction in the flexure width would create some risk for the microfabrication process due to shock problems. A further optimization of the structure will focus on flexure shape optimization (e.g. rounding corners etc.) to reduce the stress, thereby, allowing for thinner flexures and lower natural frequencies.

A comb-actuator based Fourier Lamellar Grating Interferometer is designed. The operation principle of the device is simple and a fabrication process is available. The proposed design can have better than 1 nm spectral resolution in the visible band and better than 9 nm for telecom wavelengths assuming 100 μm out-of-plane deflection. A thicker SOI wafer can be used to improve the deflection range and the resolution of the spectrometer in future design iterations. The proposed design has many advantages compared to other spectrometers available in the literature.

Fabrication and operation principles of the device are simple. This minimizes the size, complexity, cost and design effort of a fully functional system (an operational spectrometer using this device requires integration with a simple photodetector and readout circuit). Only moving part is the resonating MEMS structure.

Small system size enables portable devices.

Out-of-plane resonant mode operation of the comb actuators allows for large deflections (high spectral resolution) and high speed while providing a large light collection mirror are compared to other Lamellar Grating Interferometers reported in the literature.

Due to the operation principle, with slight modifications in the device dimensions, spectrometers for very wide range of wavelength can be realized.

Following further issues about the device are to be addressed:

Folded flexures are going to be modified in order to minimize the natural frequency and enhance uniform stress distribution along the flexures.

Gaps between the comb fingers may be increased to larger than 4 μm in order to increase the pull-in voltage.

The angle between the flexures and the side beams will be increased to 60° to suppress the lateral motion of the fingers. This modification will also lead to an increased pull-in voltage.

Larger SOI process can improve the maximum achievable deflection and the spectral resolution of the device while lowering natural frequencies.

With the present invention, a MEMS based Fourier transform spectrometer has been described employing a wavelength dispersive element formed by a set of out-of-plane mode electrostatic comb actuators, and a single light sensitive detector. A light beam illuminated on the comb fingers is separated into multiple diffraction orders. Using periodically moving out-of-plane comb fingers, intensity of the central diffraction order is modulated depending on the wavelength content of the incoming light. A MEMS spectrometer can be constructed by detecting the central order intensity with a single detector.

Preferred embodiments of the invention, finally, show some or all of the following features:

The actuator and movable diffraction grating is designed so that the top and bottom are open to allow the actuator to attain large deflections in resonance without being limited to the thickness of the wafer.

The spectrometer is configured so that the out-of-plane mode is the fundamental mode and no coupling occurs between different modes.

The spectrometer forms a broadband operation spectrometer that has an operation range limited only by the coating applied to the mirror and the response range of the detector.

The invention claimed is:

1. A Fourier transform spectrometer comprising a binary grating with variable depth, the grating comprising a first set of mirrors and a second set of mirrors, the mirrors of the first set of mirrors and the mirrors of the second set of mirrors being arranged in an alternating order and at least one of the sets of mirrors being carried by fingers of a comb structure of a device, the spectrometer further comprising an actuator for prompting an oscillating motion of the second set of mirrors and a detector for detecting a radiation reflected by the grating, wherein the mirrors are orientated in a plane defined by said device and that said motion of the second set of mirrors is given by a translation in a direction vertical to said device plane by an amount larger than the shortest wavelength of interest;

wherein said actuator is given by an electronic comb drive actuator being formed by said comb structure carrying the mirrors; and wherein the second set of mirrors is elastically connected to the first set of mirrors by flexural means, allowing the oscillating motion of the second set of mirrors.

2. A spectrometer according to claim 1, wherein the first set of mirrors is a set of fixed mirrors and that the second set of mirrors is a set of movable mirrors.

3. A spectrometer according to claim 1, wherein both sets of mirrors are carried by fingers of a comb structure, said comb structures penetrating each other.

4. A spectrometer according to claim 1, wherein the comb structure carrying the mirrors of the first set of mirrors, the comb structure carrying the mirrors of the second set of mirrors, and the flexure means are formed integrally with one another.

5. A spectrometer according to claim 1, wherein the detector is placed to measure an intensity of a zero order of a diffraction pattern generated by the grating.

6. A spectrometer according to claim 1, comprising a control device for applying an alternating voltage between electrodes of said actuator.

7. A spectrometer according to claim 1, wherein the device comprises at least one silicon layer.

8. The spectrometer according to claim 6, wherein the control device reduces the alternating voltage to a minimum value corresponding to a zero passage of the first and second sets of mirrors and increases the alternating voltage to a maximum value corresponding to a maximum deflection between the first and second sets of mirrors.

* * * * *